3,328,797
RADAR SYSTEM
Ype Jorna, Apeldoorn, and Cornelis Augustinus van Staaden, Willem Stoorvogel, and Eric Ferwerda, Hengelo, Overijsel, Netherlands, assignors to N.V. Hollandse Signaalapparaten, Hengelo, Netherlands, a firm of the Netherlands
Filed May 19, 1965, Ser. No. 456,933
Claims priority, application Netherlands, May 21, 1964, 6,405,625
15 Claims. (Cl. 343—7.9)

The invention relates to a radar system for three-dimensional position location of targets which are within the measuring range of the radar system, which radar system is provided with a continuously operating (first) radar apparatus for establishing azimuth and range of the said targets by means of an aerial continuously rotating about an axis of rotation.

It has been found that the practical realisation of this type of radar systems presents many difficulties. For example, in a known pulse-radar system of this type a complete elevation search scan is carried out each time a pulse is transmitted. With this approach, only a fraction of the pulse energy transmitted will be directed to a target, if any, and therefore this known system has the serious limitation that at a comparatively small distance of the target in question the echo pulse will fall below the noise level.

In another radar system the radar aerial which rotates continuously about a vertical axis also performs a scanning movement about a horizontal axis, the duration of which covers several pulse intervals. For accurately scanning the surrounding space, a comparatively long duration, at least several minutes, is required, so that with this known system the information density, i.e. the frequency with which the radar system supplies the position of one and the same target is particularly low while, in addition, in case of rapidly moving targets no reliable information is obtained about the position variation of the targets in question.

The same difficulties are experienced in a radar system which together with the said first radar apparatus and associated first aerial comprises a second radar apparatus with associated second aerial, the latter aerial being slewed in azimuth from target-to-target found by means of the first radar apparatus to determine elevation and range of these targets. In addition, this system has the disadvantage that when the number of targets increases the information density decreases.

It is the object of the invention to provide a radar system of the type described in the introduction which in cooperation with a second radar apparatus with an associated second aerial determines the position of a target in time and space and offers in combination the following advantages:

(a) suitable for a great number of targets;
(b) great information density which, in addition, is practically independent of the number of targets;
(c) reliable information about position variation also in the case of rapidly moving targets;
(d) simultaneous measurements of the three target coordinates;
(e) output of the three target coordinates in a digital form;
(f) favourable signal-to-noise ratio also at a comparatively large range.

According to the invention, for that purpose, the said second aerial is of the type having an electronically elevated beam and continuously rotates about an axis of rotation having the same orientation as the axis of the first aerial while the radar system is further provided with an azimuth comparison device coupled to both radar apparatus which device at the instant that the azimuth direction of the second aerial corresponds to the azimuth direction of a target detected with the first radar apparatus, releases the second radar apparatus for the time required to carry out an elevation search scan for determining the elevation and range of that target and at the same instant, for that purpose, starting from a given initial value, varies electronically the beam emerging angle of the beam(s) then emitted by the second aerial, at least one of the two aerials occupying an oblique position with respect to its axis of rotation which ensures that the beam(s) emitted during an elevation search scan by the second continuously rotating aerial, scan(s) that part of space which corresponds to the part of space covered by the beam of the first aerial at the instant of detection of the said target.

To obtain a simple construction and a simple control, the aerial associated with the first radar apparatus and the aerial associated with the second radar apparatus are preferably made to rotate together about a common axis of rotation while further they are rigidly arranged with respect to each other.

The azimuth comparison device preferably forms part of an electronic digital computer constructed from conventional memory, computing and control units, the radar system according to the further invention being constructed so that, when the azimuth, the range and the elevation of a target are established by the joint operation of the first and the second radar apparatus, the three-dimensional position location of that target is further carried out by the second radar apparatus. For that purpose, each time the azimuth direction of the second aerial corresponds to the azimuth direction of the target, the second radar apparatus is released by the computer for the time required to carry out a position measurement scan, while at the same time the beam emerging angles of the beams emitted during this time-duration, starting from two initial values determined by the computer in accordance with the elevation of the target, are varied so that the said beams perform a step-wise beam movement in two intersecting scanning planes, the position of the target being on or close to the line of intersection of these planes.

In order that the invention may readily be carried into effect, it will now be described in greater detail, by way of example, with reference to the accompanying drawings, in which:

FIG. 1 is a block-schematic diagram of a first embodiment of the radar system according to the invention;
FIG. 2 is a diagram to explain the elevation search scan which, when the aerial rotates, extends vertically;
FIG. 3 shows in a graph the relationship betwen azimuth and elevation of the second aerial mounted at an oblique angle with respect to its axis of rotation;
FIG. 4 is a diagram of the vertical elevation search scan when use is made of transmitted pulses which are divided in two parts;

Figure 1:
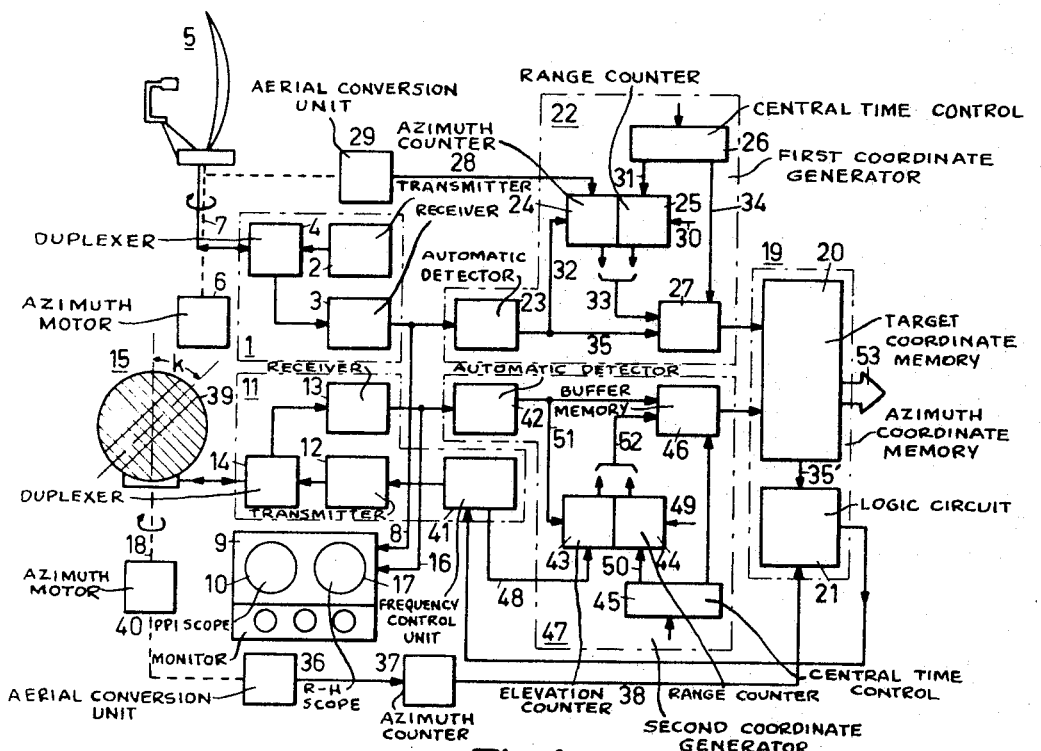

In the embodiment shown in FIG. 1 of the radar system according to the invention, reference numeral 1 denotes a continuously operative first radar apparatus which comprises a transmitter 2 and a receiver 3 which are coupled to an associated aerial 5 through a duplexer 4. The construction of the aerial 5 is such that the beam pattern of this aerial is fan-shaped or cosecant-squared-shaped in the elevation plane and narrow in the azimuth plane. Driven by the azimuth motor 6, this aerial continuously rotates about its axis of rotation 7 while it is fed with pulses by the transmitter 2. Consequently, this first radar apparatus scans the surrounding space continuously with a rotating beam which is wide in elevation, the targets within the measuring range of the radar apparatus reflecting a small part of the transmitted pulse energy. The video pulses occurring at the output of the receiver 3 on detection of these target-echoes are supplied through the line 8 to a monitor 9 with plan-position indicator 10 for establishing azimuth and range of these targets.

The system is further provided with a second radar apparatus 11 with a transmitter 12 and a receiver 13 which are coupled, through a duplexer 14, to an associated second aerial 15 for determining elevation and range of the said target. The said monitor is provided with means known per se for selecting, by means of a cursor, a target indicated on the plan-position indicator. The echo signals received by means of the second radar apparatus from a thus selected target are supplied, after detection, to the monitor 9 through the line 16 for indication on a R–H screen 17 which indicates the range and height of the target.

According to the invention, a particularly favorable and in every respect advantageous radar system for three-dimensional positional location is obtained when the said second aerial 15 is constructed as an electroncially elevatable aerial which continuously rotates about an axis of rotation 18 with the same direction of the axis as that of the first aerial 5 and the radar system is further provided with an azimuth comparison device 19 coupled to both radar apparatus 1 and 11 which, each time when the azimuth direction of the second continuously rotating aerial 15 corresponds to the azimuth direction of the target detected with the first radar apparatus 1, releases the second radar apparatus 11 to determine the elevation search scan and at the same time varies electronically the beam emerging angle of the beam then emitted by the second aerial 15 during this duration starting from a given initial value to perform such an elevation search scan. At least one of the two aerials 5, 15 assumes an oblique position with respect to its axis of rotation 7, 18 which ensures that the beam emitted by the second continuously rotating aerial 15 during an elevation search scan scans that part of space which corresponds to the part of space covered by the beam of the first aerial 5 at the instant of detection of the said target.

In the embodiment shown in FIG. 1 of the radar system the said azimuth comparison device 19 comprises a circuit arrangement for comparing binary numerical values corresponding to the said azimuth directions to be compared. Circuit arrangements for comparing binary numerical values are sufficiently known by the electronic computer technology so that it is sufficient here to state that such a type of circuit arrangement in principle comprises a number of registers, for example in the form of a magnetic memory 20 constructed of a great number of magnetic ring cores with rectangular hysteresis loop, and a logic circuit 21. In the embodiment shown in FIG. 1, the memory 20 (target coordinate memory) of the azimuth comparison device 19 is constructed for storing and keeping up in a digital form position data of a great number of targets, while the logic circuit 21 serves for continuously comparing the momentary azimuth direction of the continuously rotating aerial 15 converted in a binary form with the azimuth direction of each one of the targets stored in the said memory 20. The azimuth and range data that are to be stored in this memory are derived in a binary form from a first coordinates generator 22 consisting of an automatic detector 23 connected to the output of the receiver 3, azimuth and range counters 24 and 25 respectively, a central time control 26 and a buffer memory 27. These units are connected as diagrammatically shown in FIG. 1. The azimuth counter 24 is coupled through line 28 to an aerial conversion unit 29 which supplies, for example, a counting pulse with every milliradial movement of the aerial 5 and which supplies a reset pulse at 0°, 90°, 180° and 270° movement of this aerial. The azimuth counter 24 counts these pulses, always starting again when a reset pulse is received, thus continuously keeping up the azimuth direction of the aerial 5, as well as the quadrant, in a digital form. The range counter 25 counts range counting pulses which are supplied to the input 30, always starting again when a starting pulse is received, which, derived from the synchronization pulse, is supplied through line 31 by the central time control 26.

The range covered by the automatic detector 23 is subdivided in a number of range quanta. It is of a construction known per se and consists of a video part not shown in the figure succeeded by a logic (digital) part. In the video part which is constituted by a threshold device and a quantizer, the video signal of the receiver 3 is standardized in amplitude and length. In the logic part, which is constituted by a statistic detector, this standardized signal is subjected to given detection criteria which are chosen very carefully. When the automatic detector finds a signal in the video signal of a number of successive listening periods in the same range quantum, which satisfies the criteria applied, then a switching pulse is supplied through line 32 to the azimuth and range counters 24 and 25 respectively which on receipt of such a switching pulse transmit the counting positions present therein at that instant which indicate in a binary form the azimuth of the center of the target and the range to the target respectively, to the buffer memory 27 through line 33. During this transmission the buffer memory 27 is controlled by an output pulse of the central time control 26 and the switching pulse of the automatic detector 23 which pulses are supplied to the buffer memory through lines 34 and 35 respectively. In view of the particular detection criteria of the automatic detector 23 false target recordings are avoided to a great extent.

The contents of the output register of the buffer memory 27 is then taken over by the azimuth comparison device 19 and recorded in the target coordinates memory 20 so that after one or several revolutions of the aerial 5 the azimuth and range of all the targets in the measuring range of the first radar apparatus 1 are recorded and kept up in azimuth sequence in the memory 20 of the azimuth comparison device 19. The second radar apparatus 11 automatically completes these target data by the associated elevation in that each time an azimuth and range recorded in the coordinates memory 20 is completed by the associated elevation, the azimuth direction of the following target in the row of targets recorded in azimuth sequence in the coordinates memory 20 is introduced through line 35' in the logic circuit 21.

The continuously rotating aerial 15 is coupled to an aerial conversion unit 36 and an azimuth counter 37 which, in a manner quite corresponding to that described in connection with azimuth counter 24, continuously keeps up in a digital form the azimuth direction and the quadrant of the aerial 15 with reference to the counting and reset pulses supplied by the conversion unit 36. The azimuth direction of aerial 15 which corresponds to the counter position and quadrant indication of the azimuth counter 37 and varies with the aerial rotation, is continuously introduced through line 28 into the azimuth comparison device 19 and compared in the logic circuit 21, with the azimuth direction introduced therein through line 35′. Each time the logic circuit 21 of the azimuth comparison device 19 finds that the azimuth direction of the aerial 15 corresponds to such an azimuth value introduced into the logic circuit 21 from the memory 20 through line 35′, the second radar apparatus 11 is released by the azimuth comparison device 19 for the time required to carry out an elevation search scan and at the same time causes the beam emerging angle of the beam then emitted by the aerial 15 to be varied electronically for this period of time so as to determine, by means of the thus performed elevation search scan, the elevation and range associated with the target in question.

The electronic variation of the beam emerging angle has the advantage that no moving components are required and the elevation search scan can consequently be carried out very rapidly.

In the embodiment shown in FIG. 1 the electronically scanning second aerial 15 is of the frequency sensitive type which, as diagrammatically shown in the figure, is constituted by a number of slot radiators 39 which combined to form a "plate" are fed through a dispersive line radiator located on the rear side of the said plate and consequently not visible in the figure. As known, with this type of aerials the beam emerging angle varies with the carrier wave frequency of the pulse energy supplied to the aerial and therefore, by variation of the carrier wave frequency, an elevation search scan can be effected.

Naturally, such an elevation search scan can supply information about the elevation of a target detected with the first radar apparatus only when this elevation search scan takes place in that part of space which corresponds to the part of space covered by the fan-shaped beam of the first aerial at the instant of detection of said target.

In the present embodiment, the beam plane of the continuously rotating first aerial 5 extends vertically and the beam emitted by the second aerial 15 when the second radar apparatus 11 is released performs a vertically upward elevation search scan notwithstanding the fact that this second aerial is continuously driven with uniform speed by azimuth motor 40. This is achieved for example by tilting the continuously rotating second aerial 15 through an angle $k$ shown in FIG. 1 with respect to its axis of rotation 18. As a result of this inclined position of the aerial an azimuth movement of the beam occurs during the upward movement of the said beam which is opposite to the direction of rotation of the aerial 15 shown in FIG. 1 which, in case of a suitably chosen variation of the carrier wave frequencies of the elevation search scan pulses, cancels the azimuth movement of the beam occurring as a result of the aerial rotation.

Figure 2:
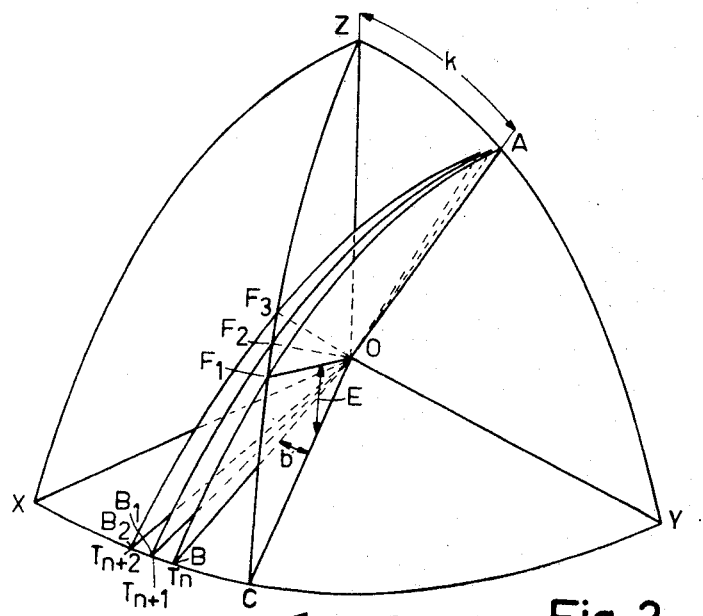

To illustrate this relationship, FIG. 2 shows, in a rectangular system of coordinates XYZ, the positions which the inclined scanning plane AOB of the aerial 15 rotating in the direction of the arrow and tilted over an angle $k=45°$ successively assumes at the instants $T_n$, $T_{n+1}$, $T_{n+2}$, at which an elevation search scan pulse is emitted. The scanning plane AOB represents the plane in which the beam would move during an elevation search scan when the aerial 15 were stationary. However, the aerial 15 continuously rotates during the elevation search scan and the scanning plane consequently assumes the positions shown in the figure at the instants $T_n$, $T_{n+1}$, $T_{n+2}$ at which an elevation search scan pulse is emitted, the azimuth direction of the aerial being given by OB, $OB_1$, $OB_2$. The number of positions assumed by the scanning plane AOB is, for clearness' sake, restricted to three in FIG. 2; actually, this number naturally corresponds to the number of pulses emitted during a complete elevation search scan.

Let it be assumed that at the instant $T_n$ an elevation search scan pulse is emitted with such a carrier wave frequency that the beam $OF_1$ in the scanning plane AOB has an elevation E; it then appears from the figure that at this elevation the azimuth direction of the beam $OF_1$ differs by a given angle $b$ from the aerial azimuth direction OB. It can now be proved mathematically that the relationship between E and $b$ is given by the equation $$\tan E = \frac{\sin b}{\tan k} \quad (1)$$

The angle over which the aerial 15 is tilted is 45° and consequently $\tan k=1$. The above equaton may consequently be written as $$\sin b = \tan E \quad (2)$$

Figure 3:
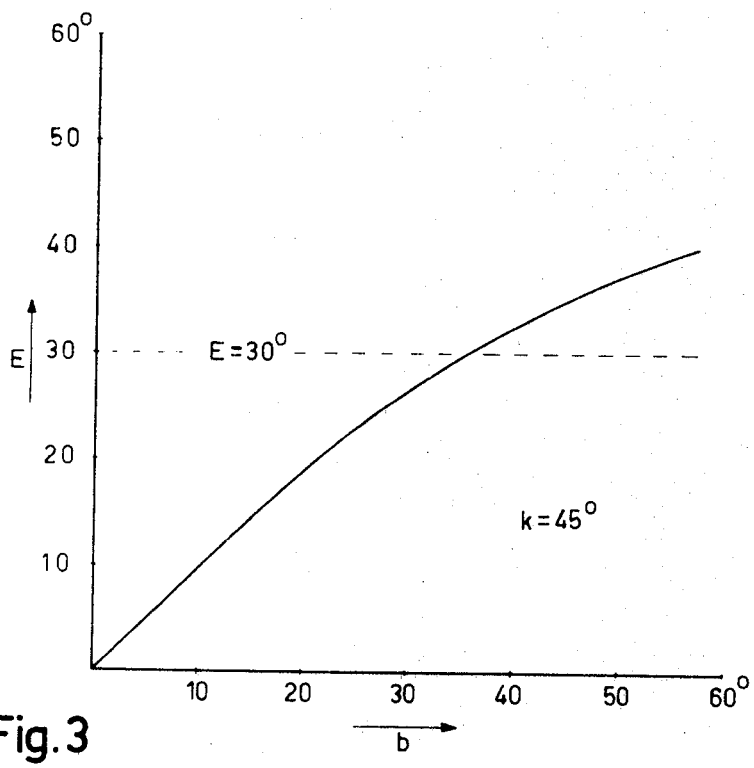

A graphical representation of this relationship to which will be referred below is given in FIG. 3. By differentiating both the left and the right terms of the equation $\sin b = \tan E$ with respect to time, it is found that $$\frac{db}{dt} = \frac{\dfrac{dE}{dt}}{\cos^2 E \sqrt{1-\tan^2 E}} \quad (3)$$

wherein $db/dt$ is the speed at which the beam moves in azimuth as a function of the elevation movement. It is clear from FIG. 2 that this azimuth movement of the beam is opposite to the azimuth movement of the beam occurring as a result of the aerial rotation. A vertical elevation search scan is obtained by choosing the respective carrier wave frequencies of the elevation search scan pulses emitted successively at the instants $T_n$, $T_{n+1}$, $T_{n+2}$, etc. to be such that the associated values of E and $dE/dt$ yield a value of $db/dt$ (see Equation 3) which at all times equals the aerial rotational speed. The resulting azimuth movement of the beam then is zero and the beam consequently moves exclusively in the vertical plane COZ, i.e. the carrier wave frequencies of the pulses emitted at the instant $T_n$, $T_{n+1}$, $T_{n+2}$, etc. direct the beam stepwise acording to $OF_1$, $OF_2$, $OF_3$ etc. In the elevation measuring range which extends in the present embodiment over a range of 0–30°, the elevation increment of the beam moving upwards vertically per emitted pulse is practically constant as appears from the variation of the E–b curve shown in FIG. 3 which is substantially linear up to 30° elevation. The value of this constant elevation increment is determined by the value of the angle of tilt $k$, as well as by the pulse recurrence frequency of the elevation search scan pulses emitted and the rotational speed of the aerial. In the present embodiment (in which the angle of tilt $k=45°$), the second radar apparatus operates synchronously with the first apparatus. Consequently, the second radar apparatus must be released for a sufficiently long period of time to perfom an elevation search scan. During this period the second radar apparatus transmits a number of pulses, in which the carrier wave frequency of these pulses, starting from a fixed initial frequency, varies in a manner such that the beam transmitted by the second aerial 15 moves upwards by a fixed elevation increment per transmitted pulse. To produce the required frequencies, the second radar apparatus which is coupled to the aerial 15, is provided with a frequency control unit 41, which consists of an assembly of crystal oscillators, gate circuits, amplifiers, mixer stages, frequency multipliers, modulators etc. by means of which a number of equidistant frequencies is produced which correspond to the number of pulses transmitted per elevation search scan and which are numbered in a fixed sequence. To control the gate circuits, the frequency control unit is further provided with a digital counter which, during the said release of the second radar apparatus, controls the said gate circuits through the intermediary of a fixed program built-in in the frequency control unit in a manner such that the said equidistant frequencies are applied to the transmitter 12 as a control signal in a fixed sequence in the form of a corresponding number of pulse-modulated carrier waves.

Since every vertical elevation search scan performed by the aerial 15 takes place under the control of the azimuth comparison device 19 when the azimuth direction of the aerial 15 corresponds to the azimuth direction of a target detected by the first radar apparatus, such as an elevation search scan will result in the reception of a number of target echo pulses. After detection in the receiver 13, these pulses are applied to the automatic detector 42 connected to the output of this receiver. This automatic detector in principle operates in a manner which quite corresponds to the automatic detector 23 mentioned above. Together with an elevation counter 43, a range counter 44, a central time control 45 and a buffer memory 46, it constitutes a second coordinates generator 47.

The elevation counter 43 counts the elevation search scan pulses applied to the transmitter 12 by the frequency control unit 41 during the elevation search scan and is for that purpose connected through line 48 to an output of the frequency control unit. Since the beam moves upwards by a fixed elevation increment within the measuring range of 0–30° per transmitted elevation search scan pulse, the momentary elevation of the beam during an elevation search scan is constantly kept up by the elevation counter 43 with reference to the number of elevation search scan pulses supplied to it.

The range counter 44 counts the regularly occurring range counting pulses, which are supplied through the input 49, and always starts again when a starting pulse is received, which, derived from the synchronisation pulse, is supplied by the central time control 45 through line 50. When the automatic detector 42 finds a signal in the video signal of a number of successive listening periods in the same range quantum which meets the detection criteria applied in the automatic detector, a switching pulse is supplied through line 51 to the elevation and range counters 43 and 44 respectively which, when such a switching pulse is received, transmit the counting positions present therein at that instant—which, in a binary form, present the elevation of the center of the target as well as the range of that target—through line 52 to the buffer memory 46. In this case also it holds that false recordings are avoided to a great extent by the particular detection criteria of the automatic detector 42.

The output register of the buffer memory 46 is then read-out by the azimuth comparison device 19 and the elevation and range information are stored in the target coordinates memory 20 with the azimuth and range information of the target in question already present therein, while also the total of this information i. e. azimuth and distance, and elevation and distance of the target occurs in a digital form at the output 53 of the azimuth comparison device.

The radar system shown in FIG. 1 operates at such a pulse recurrence frequency and speed of rotation that the number of echo pulses per aerial beam width is sufficient for a good operation of the automatic detector 42 connected to the output of the receiver 13.

At a lower pulse recurrence frequency and/or a higher speed of rotation of the aerial the number of echo pulses per aerial beam width may be insufficient for using automatic detection. However, this number can be doubled in a particularly simple manner.

Figure 4:
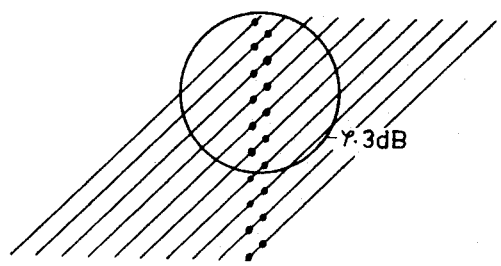

In an embodiment of the radar system shown in FIG. 1 which is suitable for a lower pulse recurrence frequency and/or a higher speed of rotation of the aerial, the frequency control unit is for that purpose constructed so that the transmitter of the second radar apparatus, on being released, supplies elevation search scan pulses which are each split in two parts P and Q, each part having its own frequency, so that the second aerial as a matter of fact radiates two beams which are shifted in elevation. In this case, the frequency difference between the two parts is constant. This is shown in FIG. 4 in which part of the vertical elevation search scan is represented. The oblique scanning lines represent the lines of intersection of the tilted aerial scanning plane with a part of the sphere which has the second aerial 15 for its centre at the instant of transmission of the respective elevation search scan pulses. The dots which are located two by two over each other represent the beam centres while the circle shown in this figure is the aerial beam width in the $3dB$ points in cross-section. It is clearly shown in this figure that the number of target-echo pulses which can be received per aerial beam width is twice as large in the case of split pulses than in the case of single pulses.

It is noted that the elevation search scan can also be carried out, if desired, in a downwards direction. For this purpose it is required only that the frequency variation varies in a reverse direction and that the aerial 15 is tilted with respect to its axis of rotation in a direction which, in contrast with the embodiment described, is the same as the direction of rotation of the aerial.

The value of the angle of tilt $k$ is not very critical; it may be 45°, but may also have a different value. It is to be noted in this connection that the value of the angle of tilt $k$ also determines the maximum value of the elevation measuring range as well as of the value of the blind sector occurring after every just completed elevation search scan as a result of the aerial rotation.

In the embodiment described above the first aerial 5 is mounted so that the beam plane of this aerial is vertical, while the second aerial 15 is tilted with respect to its axis of rotation through an angle $k$ against the direction of rotation of this aerial. As a result of this, one of the conditions essential for a successful elevation measurement can be fulfilled, namely that the beam transmitted during an elevation search scan by the rotating second aerial 15 scans that part of space which corresponds to the part of space which is covered by the fan-shaped beam of the first aerial at the instant of detection of a target. However, this condition may also be met when instead of the second aerial 15 the first aerial 5 is tilted over an angle $k$ with respect to its axis of rotation. In view of this duality all intermediate variants, in which both the first and the second aerial are mounted at an oblique angle with respect to their axis of rotation, are of course possible.

It is by no means necessary that the comparison of the azimuth direction of the aerial 15 with the azimuth direction of the targets is effected in the digital method described in the embodiment; naturally, it may also be effected according to known analogous comparison methods.

In contrast with the embodiment shown in FIG. 1, in which the aerials 5 and 15 each rotate about their own axis of rotation, and are each driven by a separate azimuth motor, it is of particular advantage to cause these two aerials to rotate together about a common axis, in which these aerials are then fixedly arranged with respect to each other. In such an embodiment of the aerials the control thereof is simpler. This latter is of particular importance in the embodiment shown in FIG. 5 in which the second radar apparatus operates with transmission pulses split in two parts and the second aerial 15 performs two types of measurement, namely:

(a) the elevation measurement which is carried out with respect to newly occurring targets, in order to complete the two dimensional target position determined by means of the first apparatus by the third coordinate. This measurement is realized in the above described manner by causing the beams of the second continuously rotating aerial to perform a vertical scan (elevation search scan) in the azimuth direction of the target;

(b) the position measurement which is regularly carried out on all "known" targets to measure the three coordinates of the target position simultaneously. This measurement is realised by causing the beams of the second continuously rotating aerial to perform a cross-shaped movement (position measurement scan) over the predicted target position.

Figure 5:
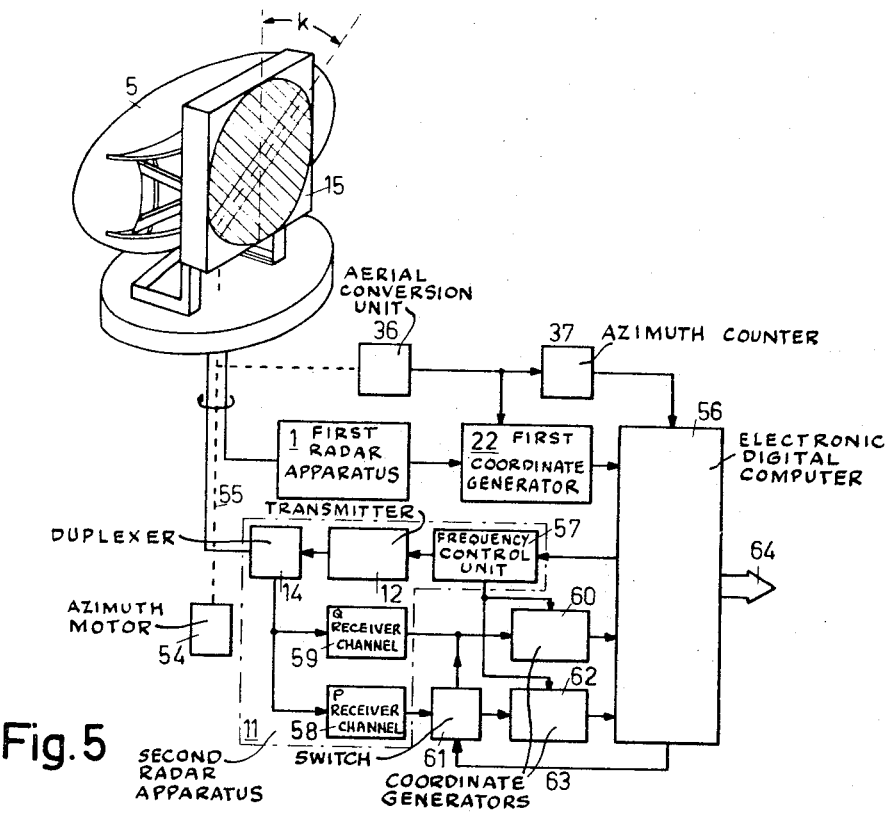
FIG. 5 is a block-schematic diagram of a second embodiment of the radar system according to the invention.

In the embodiment shown in FIG. 5, the parts corresponding to certain parts of FIG. 1 have been given the same reference numerals. The embodiment shown in FIG. 5 again comprises a first radar apparatus 1 which is coupled to an associated first aerial 5, and a second radar apparatus 11 which is coupled to the associated second aerial 15. The aerials 5 and 15 are fixedly arranged with respect to each other in a manner such that they enclose a fixed angle of 180° in the horizontal plane. Driven by azimuth motor 54 the two aerials rotate together about a common axis of rotation 55. In a manner quite corresponding to that described with reference to FIG. 1, azimuth and range of the targets within the operating range of the radar system are supplied by the first radar apparatus when the aerial system 5, 15 is rotated, and these azimuth and range data are automatically completed, under the control of an azimuth comparison device, by the associated elevation and range determined by means of the second radar apparatus. It is to be noted that in view of the fixed angular relationship of 180° which the two aerials 5 and 15 have in the horizontal plane only one aerial conversion unit 36 coupled to the axis of rotation 55 is required for keeping up in a digital form the azimuth directions of aerials 5 and 15 respectively. The azimuth direction of the aerial 15 is constantly kept up in a digital form in the azimuth counter 37 with reference to the counting and resetting pulses supplied by the conversion unit 36 while the azimuth direction of the aerial 5 is continuously kept up in the azimuth counter which forms part of the coordinate generator 22. The latter azimuth counter naturally is leading in counter position by two quadrants=180° with respect to the azimuth counter 37.

The embodiment shown in FIG. 5 distinguishes from the embodiment shown in FIG. 1 in that, according to the further invention, the azimuth comparison device forms part of an electronic digital computer 56 which is constructed from the conventional computing memory and control units and which effects that, when the azimuth and range and elevation are found of a target by the joint operation of the first and second radar apparatus, the three dimensional position location of that target is further carried out in general by the second radar apparatus 11 with associated second aerial 15. For that purpose, each time the azimuth direction of the second aerial 15 corresponds to the azimuth direction of a target of which azimuth, range and elevation are already known from preceding measurments, the second radar apparatus is released by the computer 56 for the time required to carry out a position measurement scan, while at the same time the beam emerging angles of the two beams emitted by the second aerial 15 during this time duration, starting from two initial values determined by the computer in accordance with the elevation of the target, are varied so that the said beams perform a stepwise beam movement in two intersecting scanning planes, the (predicted) position of the target in question being on or close to the line of intersection of these planes.

As proved with reference to FIG. 1 it is the inclined position of the second aerial 15 in combination with the electronic control of the beam emerging angle of this aerial that renders it possible that with rotating aerial a vertical elevation search scan can be performed. The electronic control of the beam emerging angle of the aerial 15, however, also renders it possible, with rotating aerial, to perform the said position measurement scan which consists of a cross-wise movement of two beams in any desired azimuth direction and at any desired elevation between, for example, 0° and 30°.

The second radar apparatus 11 coupled to this second aerial 15 is for that purpose provided with a frequency control unit 57 which, as the frequency control unit 41 (FIG. 1) is constructed for producing a number of equidistant frequencies numbered in a fixed sequence. However, in this case the control is not effected by means of a fixed program built in the frequency control unit but by means of instructions supplied to the frequency control unit 57 by the computer 56. In this embodiment also the target information is stored in azimuth sequence in a coordinates memory and the targets are handled in the said azimuth sequence.

When, with respect is a target to be handled, only azimuth and range are known, the computer determines, by means of azimuth comparison, the instant at which the aerial 15 assumes the correct azimuth position for performing an elevation search scan and at this instant starts in the computer a fixed routine as a result of which the number of instructions required for performing an elevation search scan is supplied to the frequency control unit 57 in a fixed sequence. Each of these instructions appears at the input of the frequency control unit always a short period of time before the instant of transmitting a transmission pulse split into two parts and each of these instructions is decisive of the carrier wave frequencies of these parts so that for each pulse, two beams of different elevation are radiated (see FIG. 4).

Figure 6:
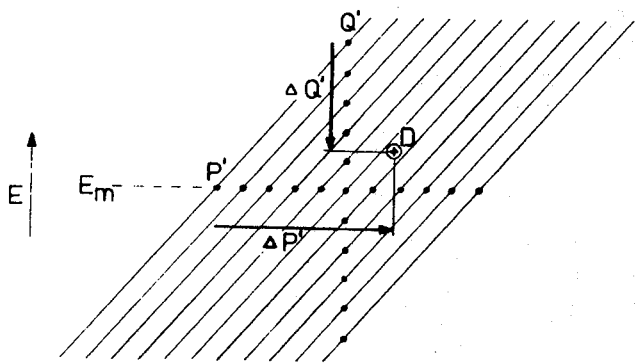
FIG. 6 is a diagram of the cross-shaped position measurement scan.

When, on the contrary, of the target to be handled not only azimuth and range but also elevation is known, the computer determines the instant at which the aerial 15 assumes the correct azimuth position for performing a position measurement scan and at this instant starts a given routine which determined by the elevation of the target, causes the number of instructions required for performing a position measurement scan to be supplied to the frequency control unit 57. Each of these instructions again determines the two carrier wave frequencies of a transmission pulse divided into two parts. However, in this case the frequency difference is not constant but varies so that the elevation difference of the two beams becomes smaller and smaller, passes through zero and then increases again (with reversed sign). By correctly programming the frequencies as incorporated in the said position measurement scan instructions it is achieved that the two beams each perform a straight line movement, which movements intersect each other in the predicted target position. FIG. 6 shows a position measurement scan for a target of which the position predicted by the computer is given by: azimuth $B_m$, elevation $E_m$ and range $A_m$.

The oblique scanning lines again represent the lines of intersection of the tilted aerial scanning plane with part of the sphere with radius $A_m$ which has the second aerial for its centre, at the instant of transmitting the respective pulses. The dots on these scanning lines correspond to the beam centres and together form a "cross" of which the "arms" indicated by P' and Q' respectively intersect each other in the predicted target position. The beam space between successive beam centres is equal and constant in both arms of the cross. The actual position of the target is indicated in the figure by D. During the position measurement scan $\Delta P'$ and $\Delta Q'$ (see FIG. 6) are determined, so as to thereby establish the position of the target in the said cross.

Since in the present embodiment the second radar apparatus operates with transmitting pulses which are split into two parts P and Q, each part having its own frequency, the echo signal always consists of two pulses with different frequencies. In connection therewith, the receiver of the second radar apparatus comprises two separate receiving channels, namely a P receiving channel 58 and a Q receiving channel 59 (the name of these receiving channels relates to the P-part and the Q-part respectively of the transmitting pulse). The video output of the Q-receiving channel 59 is connected to coordinates generator 60, while the video output of the P-receiving channel 58 can be connected, by means of a switch 61, either to the said coordinates generator 60, or to a third coordinates generator 62. In this case the switch is controlled by the computer 56 through line 36 in a manner such that the video output of the P-receiving channel 58 is connected, during an elevation search scan, to the coordinates generator 60 and, during a position measurement scan, to the coordinates generator 62.

During an elevation search scan, the first pulse of the echo signal consisting of two pulses is detected in the Q-receiving channel 59, while the second pulse of the said echo signal is detected in the P-receiving channel 58 and the video signals occurring at the output of the P-receiving channel and Q-receiving channel respectively, are exclusively supplied to the coordinates generator 60. This coordinates generator operates according to the principle already described above with reference to the coordinates generator 47 (FIG. 1) and determines in a corresponding manner elevation and range of a target and supplies these data to the computer 56 in the form of the number of transmitted pulses to the center of the target and the number of range quanta to the centre of the target respectively.

During a position measurement scan the first pulse of the echo signal consisting of two pulses is detected in the Q-receiving channel 59 and is applied to the coordinates generator 60 as a video signal, while the second pulse of the echo signal is detected in the P-receiving channel 59 and is applied to the coordinates generator 62 as a video signal. The coordinates generator 62 is of the same construction and also operates according to the same principle as the coordinates generator 60. The information occurring in a digital form during a position measurement scan at the output of the coordinates generators 60 and 62 respectively consists of range (as in the elevation measurement) and further of $\Delta P'$ and $\Delta Q'$, constituting the number of transmitted pulses in the P- and Q-arm respectively of the cross to the centre of the target determined in the coordinates generators 62 and 60 respectively. A number of pulses which is transmitted during a complete position measurement scan, which number is favorable with respect to the automatic detection, is 17. The computer 56 calculates from the information received from the coordinates generators 60 and 62 the correction of the predicted target position and stores the corrected target position in the target coordinates memory, while this also occurs in a digital form at the output 64 of the computer.

The computer coordinates and correlates the actions of the first and the second radar apparatus so as to render possible, in cooperation with the remaining parts of the system, the simultaneous determination of the three coordinates of each of the targets within the operating range of the system. It is constructed for handling a great number of data on a "real time" basis.

Since any "universal" digital computer having a sufficiently large computing speed is suitable for performing these tasks, the construction of the computer need not be further discussed in this connection the more so since this is not necessary for a good understanding of the invention.

In the above described embodiments, the measuring range of the second radar apparatus extends in the elevation up to 30°. In case of a larger measuring range, the non-linear variation of the E–$b$ curve shown in FIG. 3 must be taken into account. As a matter of fact, as a result of the non-linearity of the E–$b$ curve, the number of echo pulses received from one and the same target increases noticeably with the elevation of this target above 30° elevation. When using automatic detection such a variation of the number of echo pulses received is less desirable.

In connection herewith the second radar apparatus of an embodiment of the radar system according to the invention suitable for a larger elevation measuring range is constructed so that one and if desired two emitted beams may be used per aerial scanning plane (P-parts and Q-parts of the transmission pulse) and this radar apparatus is controlled by the computer in a manner such that the elevation increment of the beam is constant throughout the measuring range with a deviation remaining within the tolerance with respect to a purely vertical elevation search scan. In addition to a correct frequency programming as contained in the elevation search scan instructions supplied by the computer to the frequency control unit, the computer controls the second radar apparatus in a manner such that in case of small elevations two beams are used per aerial scanning plane (splitted pulse) and in case of large elevations one beam per aerial scanning plane (non-splitted pulse) is used, while in the intermediate range a correct performance is realised by a correct succession of these two types of pulses.

Figure 7:
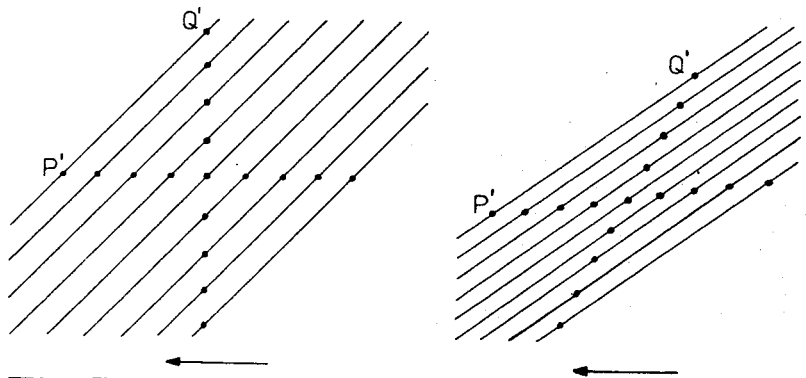
FIG. 7 shows in diagrams the position of the cross-shaped position measurement scan in case of a target at low respectively high elevation.

In such an embodiment it is also possible to keep the space between successive beam centres in each of the arms of the cross of the position measurement scan constant by choosing the frequencies contained in the position measurement scan instructions to be such that the arms of the cross have a position which varies with the elevation, the angles which the P arm and the Q arm of the cross enclose with the oblique scanning lines being equal to one another also in case of an elevation exceeding 30° elevation of the cross. This is shown in FIG. 7 in which the left-hand part of this figure shows the position of the cross in case of low elevation and the right-hand part shows the position of the cross in case of high elevation.

In the radar system according to the invention it is necessary that the beam emerging angle of the beam transmitted by the second aerial can be controlled electronically. In the embodiment described a frequency-dependent aerial is used for this purpose. It will be clear that instead of a frequency dependent aerial with associated frequency control unit, the known phase-sensitive aerial and associated means for controlling the beam emerging angle of this aerial may alternatively be used.

What we claim is:

1. In a radar system for 3-dimensional position location of targets in the measuring range of the radar system of the type comprising a continuously operative first radar apparatus for establishing the azimuth and range of said targets by means of at least one first aerial rotating about an axis of rotation and associated with the said radar apparatus, and a second radar apparatus including at least one continuously rotating second aerial for determining elevation and range of said targets; the improvement wherein said second aerial is of the type having means for electronically elevating its beam and means for continuously rotating said second aerial about an axis of rotation having the same orientation as the axis of the first aerial, the radar system further comprising an azimuth comparison device coupled to said first and second radar apparatuses, said device comprising means for releasing said second radar apparatus for a predetermined time to execute an elevation search scan at each time the azimuth direction of said second radar system corresponds to an azimuth direction at which said first radar apparatus has detected a target for determining the elevation and range of that target, said second radar apparatus comprising means responsive to said release to electronically vary the beam emerging angle of the beam then emitted by the second aerial starting from a predetermined initial angle, at least one of the two aerials occupying an oblique position with respect to its axis of rotation whereby said beam emitted during an elevation search scan by the second continuously rotating aerial scans that part of space which corresponds to the part of space covered by the beam of the first aerial at the instant of detection of the said target.

2. A radar system as claimed in claim 1 wherein said first and second aerials are rigidly connected with respect to each other and rotate together about a common axis of rotation.

3. The radar system of claim 1 in which said second aerial comprises a frequency-dependent aerial which rotates about an axis of rotation, said second aerial comprising a number of slot radiators, combined to form a "plate," a dispersive line radiator for feeding said slot radiators, said second aerial being tilted in its entirety with respect to its axis of rotation over an angle so that in case of suitable chosen frequency variation of the energy supplied to the aerial with the aerial rotating, an elevation search scan can be performed which extends at right angles to the plane of revolution of this aerial, while a different choice of the frequency variation yields an elevation search scan in a plane which is not at right angles to the plane of rotation.

4. A radar system as claimed in claim 1 wherein said second aerial is a frequency-dependent aerial having a beam emerging angle which varies with the frequency of the energy supplied thereto, said second radar apparatus comprising a frequency control unit for producing a number of equidistant frequency oscillating, and means for applying said oscillations sequentially to said second aerial.

5. A radar system as claimed in claim 4, wherein said frequency control unit comprises a digital counter responsive to the release of said second radar apparatus for controlling said frequency control unit according to a fixed program fixedly whereby the equidistant frequency oscillations produced in said frequency control unit are applied to the transmitter of the second radar apparatus as a control signal in a fixed sequence in the form of a corresponding number of pulse-modulated carrier waves.

6. A radar system as claimed in claim 4, wherein said second radar apparatus comprises means for transmitting pulses which are split into two parts, each part having its own frequency, whereby said second aerial radiates two beams with different elevation for each transmitting pulse.

7. A radar system as claimed in claim 1, comprising an electronic digital computer having memory, computing and control units, wherein the azimuth comparison device forms part of said electronic digital computer, said computer comprising means responsive to the determination of azimuth, range and elevation of a target by the joint operation of the first radar apparatus and the second radar apparatus for controlling said second radar apparatus to determine the three dimensional position of said target, said second radar apparatus comprising means for transmitting two beams which computer comprises means responsive to correspondence between the azimuth direction of the second aerial and the azimuth direction of the target for releasing said second apparatus for the time required to carry out a position measurement scan, and means for controlling the beam emerging angles of the two beams emitted during this time duration starting from two initial values determined by the computer in accordance with the elevation of the target, so that the said beams perform a stepwise beam movement in two intersecting scanning planes, the position of the target being in the vicinity of the line of intersection of these planes.

8. A radar system as claimed in claim 7, wherein said second aerial is a frequency-dependent aerial having a beam emerging angle which varies with the frequency of the energy supplied thereto, said second radar apparatus comprising a frequency control unit for producing a number of equidistant frequency oscillating, and means for applying said oscillations sequentially to said second aerial.

9. A radar system as claimed in claim 8, wherein said second radar apparatus comprises means for transmitting pulses which are split into two parts, each part having its own frequency, whereby said second aerial radiates two beams with different elevation for each transmitting pulse.

10. A radar system as claimed in claim 9, wherein said computer comprises means for applying control instructions to frequency control unit before the transmission transmitting a transmission pulse split into two parts, each of these instructions determining the frequencies of these two parts, so that two beams are radiated with different elevation for each transmitting pulse.

11. A radar system as claimed in claim 10, wherein the target information collected by the radar system is recorded and kept up in azimuth sequence in a coordinates memory of the computer wherein said computer comprises means responsive to the absence of elevation information of a target for determining by means of azimuth comparison the instant at which the second aerial assumes the azimuth position which is correct for performing an elevation search scan, and means for controlling the frequencies of said two beams so that the two beams are radiated with a constant elevation difference for each transmission pulse.

12. A radar system as claimed in claim 11, characterized in that the computer for keeping constant—from pulse to pulse—the elevation increment of the beam(s) with a deviation remaining within the tolerance with respect to a purely vertical search scan, in addition to the elevation search scan instructions supplied to the frequency control unit, controls the second radar apparatus in a manner such that in case of small elevations two beams are used per aerial scanning plane (splitted pulse) and in case of large elevation one beam is used per aerial scanning plane (non-splitted pulse) while in the intermediate range a correct performance is realised by a correct succession of these two types of pulses.

13. A radar system as claimed in claim 10, wherein information relating to the azimuth, range and elevation of the target are stored in said memory and the computer comprises means for determining the instant at which the second aerial assumes the azimuth direction which is correct for performing a position measurement scan, and means for initiating a position measurement scan at said instant by applying control instructions to the frequency control unit, each of these instructions determining the two frequencies of a transmission pulse split into two parts and varying the frequency difference in a manner such that the elevation difference of the two beams radiated with every transmission pulse becomes smaller and smaller, passes through zero and then increases again (with reverse sign) so that the two beams each perform a rectilinear movement, which movements intersect each other in the predicted target position.

14. A radar system as claimed in claim 13, wherein the frequency programming as contained in the position measurement scan instructions supplied to the frequency control unit by the computer is such that the arms of the cross of the position measurement scan have a position varying with the elevation in which the angles, which the arms of the cross enclose with the oblique scanning lines, are always equal to one another.

15. A radar system for determining the azimuth, range and elevation of targets within the measuring range of said system, comprising a first continuously operating radar apparatus having a first aerial rotating about a vertical axis of rotation for producing signals corresponding to the range and azimuth of said targets, an azimuth comparison device including means for storing signals corresponding to the positions of said targets, means for applying said signals produced by said first radar apparatus to said comparison device for storage in said storing means, a second radar apparatus having a second aerial, means for continuously rotating said second aerial about an axis having the same orientation as said axis of said first aerial, means for producing an azimuth signal corresponding to the azimuth direction of said second aerial, and means for applying said last mentioned signal to said azimuth comparison device, said device further comprising means responsive to a correspondence between said azimuth signal and a signal stored in said storing means relating to the azimuth of a target for producing a release signal, and means for applying said release signal to said second radar apparatus, said second radar apparatus further comprising means responsive to each said release signal for electronically scanning its beam in an elevation direction to produce signals related to the elevation and range of targets at the azimuth direction of said second aerial, and means for applying said last mentioned signals to said comparison device for storage in said storing means, at least one of said aerials having an oblique position with respect to its axis of rotation whereby the beam emitted by said second aerial during each said elevation scan scans that part of space which corresponds to the part of space covered by the beam of said first aerial at the instant of detection of the target corresponding to the stored signal that resulted in the production of the release signal corresponding to the elevation scan.

No references cited.

RODNEY D. BENNETT, *Primary Examiner.*

CHESTER L. JUSTUS, *Examiner.*

D. C. KAUFMAN, *Assistant Examiner.*